Figure 1:
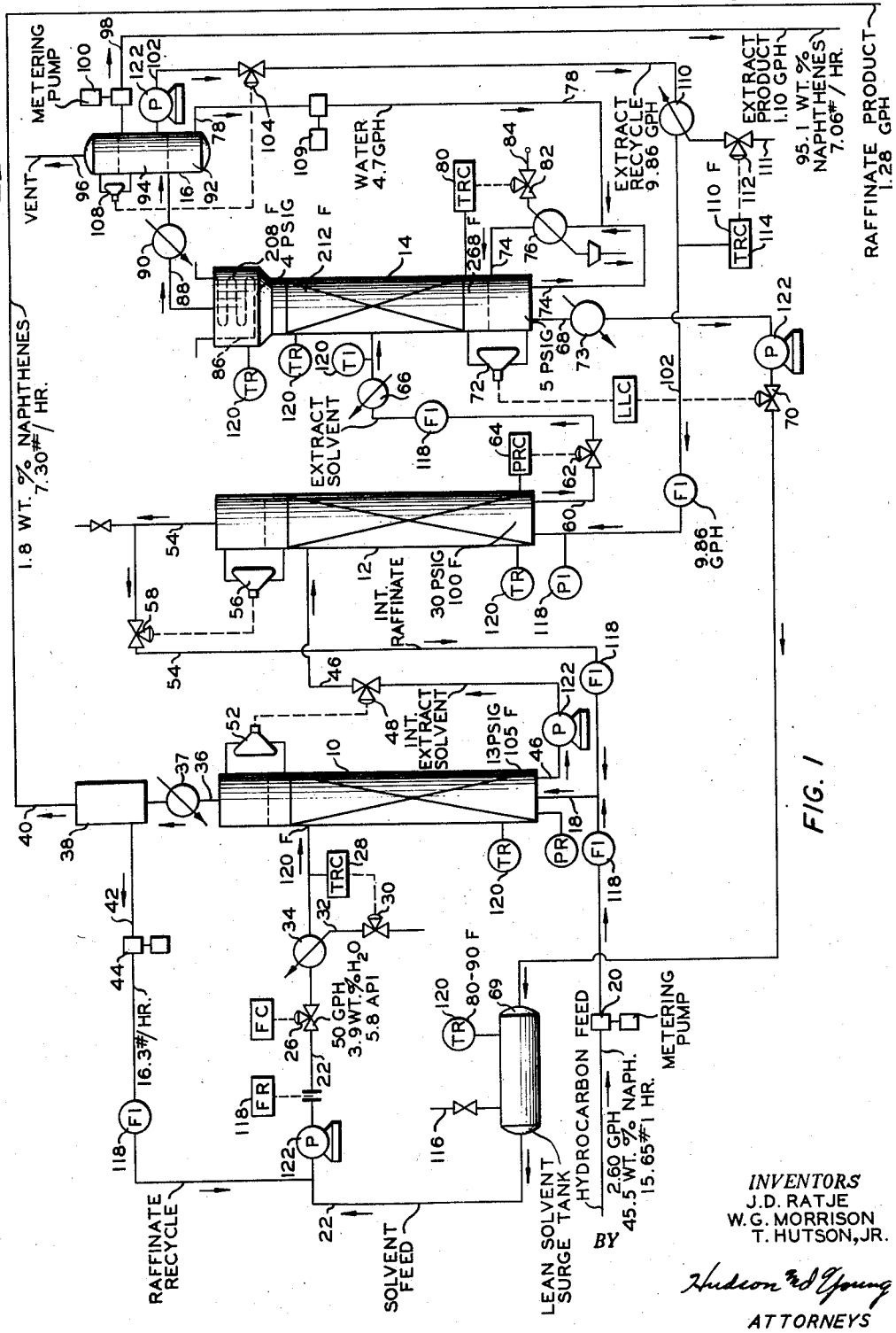

INVENTORS
J. D. RATJE
W. G. MORRISON
T. HUTSON, JR.
BY
Hudson and Young
ATTORNEYS

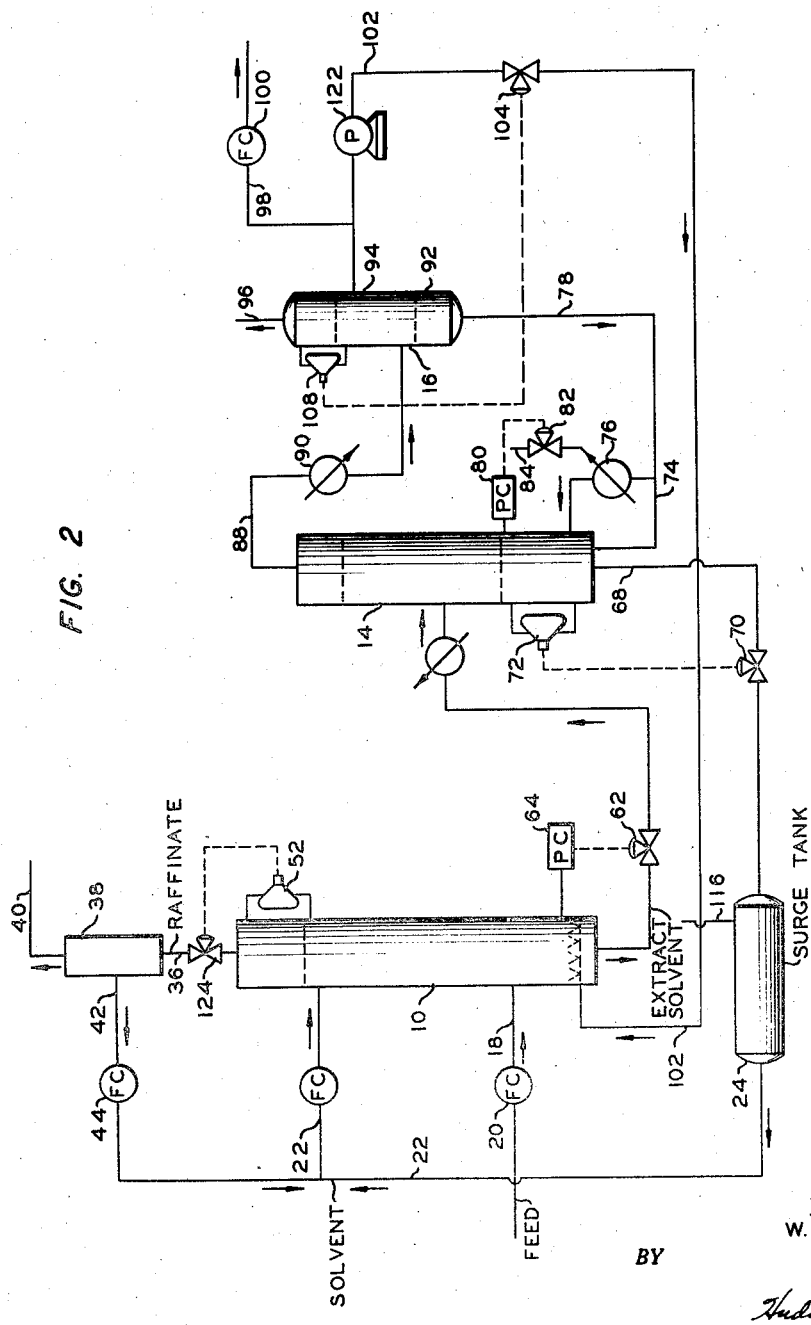

2,855,362
Patented Oct. 7, 1958

United States Patent Office

2,855,362

APPARATUS AND PROCESS FOR SOLVENT EXTRACTION

John D. Ratje, William G. Morrison, and Thomas Hutson, Jr., Phillips, Tex., assignors to Phillips Petroleum Company, a corporation of Delaware Application February 21, 1955, Serial No. 489,448

13 Claims. (Cl. 208—339)

This invention relates to a process and arrangement of apparatus for effecting solvent extraction of liquid mixtures and separation of the same into its components. A specific aspect of the invention pertains to a method and apparatus for controlling a solvent extraction process.

The separation of liquid mixtures of organic materials and particularly hydrocarbon compounds into two or more fractions of different characteristics by solvent extraction and recovery of the separated compounds from the solvent has long been practiced. As applied to hydrocarbons the selective solvent utilized usually has a greater affinity for more cyclic and/or unsaturated hydrocarbons in a series of hydrocarbons of similar molecular weight. In conventional solvent extraction processes one of the chief problems is control of the process so as to effect a uniform separation or the production of a product stream of uniform purity or high concentration of the desired component or components of the extract and/or raffinate streams. Due to process variables difficult to control, including feed composition, temperature in the various contacting zones, flow rate of streams, pressure conditions within the system, etc., constant results with smooth operation are difficult to obtain. Pressure surges within the equipment are frequent and of considerable magnitude, thereby throwing the process out of control and requiring considerable time to bring the process back on smooth operation and the product stream or streams up to the desired standard of purity or component concentration.

One of the principal objects of the invention is to provide a process and arrangement of apparatus for the efficient separation of the components of a liquid mixture, utilizing a selective solvent for one or more of the components. Another object is to provide a process and apparatus for effecting liquid-liquid extraction of a liquid mixture with accurate and close control of the flow of streams to and from the extraction column. It is also an object of the invention to provide a process and arrangement of apparatus for effecting liquid-liquid extraction which prevents surging and pressure pulsations within the extraction equipment. A further object of the invention is to provide a process and arrangement of apparatus for separating a hydrocarbon mixture into selected hydrocarbon fractions by liquid-liquid extraction with a selective solvent whereby accurate and close control of the character of the selected hydrocarbon fraction is afforded. Other objects of the invention will become apparent from a consideration of the accompanying disclosure.

The invention is applicable to the conventional solvent extraction processes of the prior art and comprises an arrangement of apparatus with controls and a method of operation for controlling a solvent extraction process so as to maintain substantially uniform and smooth process conditions throughout the extraction and separation system. In accordance with the invention the flow of feed to the extraction column and extract product from the system are metered for accurate control of the separation, and the extract recycle stream is maintained on liquid-level control and is determined by the solvent rate which is on flow control and the solubility of the extract hydrocarbon in the solvent. In the preferred embodiment of the invention, the raffinate is maintained on overflow, which is essentially liquid-level control, as the difference between the hydrocarbon feed and extract product. Liquid-interface-level controllers on the extraction column or columns control streams which permit synchronized operation of these controllers to prevent pressure surges. In combination with this arrangement of liquid-interface-level controllers the solvent-extract stream is controlled by a back-pressure controller so as to maintain a constant pressure in the extraction column.

In one embodiment of the invention, the extraction column is divided into two or more sections which are operated as separate extraction zones arranged in series, the intermediate extract phase taken from the bottom of the first column to which the feed is introduced being passed to the upper portion of the second section, and the intermediate raffinate taken from the top of the second section being introduced to the lower portion of the first section and so on with any number of sections. These separate sections may be considered as extraction columns operated in series.

The process of the invention comprises passing a feed stream including a plurality of liquid components into an intermediate section of an extraction zone; passing a stream comprising a selective solvent for at least one of the components of the feed into an upper section of the extraction zone so as to effect commingling of the feed and solvent and extraction of at least one of the feed components to form a solvent-extract phase and a raffinate phase lean in the extract and establish an interface in the extraction zone between the phases; recovering a raffinate stream from the uppermost section of the extraction zone; recovering a solvent-extract stream from the lowermost section of the extraction zone; separating the solvent-extract stream into a solvent stream and a concentrated extract stream; controlling the operation of the extraction zone and the concentration of the desired component or components in the concentrated extract stream by the steps comprising maintaining a substantially constant flow of the feed and solvent streams; withdrawing the solvent extract stream at a controlled rate; separating the concentrated extract stream into an extract product stream and an extract recycle stream; and regulating the flow rate of the extract product stream so as to maintain therein a predetermined concentration of the extracted feed component (or components); and recycling the remaining portion of the concentrated extract stream as the extract recycle stream to a lower section of the extraction zone as reflux.

The process also comprises withdrawing the raffinate stream at such a rate as to maintain the interface level in the extraction zone substantially constant and withdrawing solvent extract at such a rate as to maintain a predetermined pressure in the extraction zone by utilization of a back-pressure valve on the solvent-extract line sensitive to the pressure in a lower section of the extraction zone. In another embodiment of the process the solvent-extract stream is withdrawn at a rate which maintains the interface at a substantially constant level. When the invention utilizes two separate extraction zones connected in series, the back-pressure valve and control are applied to the lower or downstream extraction zone and the interface level in the upstream or upper extraction zone may be maintained constant by a level controller sensitive to the interface level therein and operatively in control of a flow control valve in the intermediate extract-solvent line passing from the upper extraction zone to the lower extraction zone.

Illustrative of the processes to which the invention is applicable are the separation of cycloparaffins such as cyclohexane from a mixture of the same with paraffins; separation of aromatics from a mixture with paraffins; separation of aromatics from a mixture with naphthenes and paraffins; and separation of aromatics and naphthenes from a mixture with paraffins. Commonly used selective solvents include methyl carbitol, furfural, methanol, diethyleneglycol, triethyleneglycol, acetonitrile, and their aqueous solutions, and sulfur dioxide.

A more complete understanding of the invention may be had from a consideration of the accompanying drawing of which Figure 1 is a flow diagram illustrating one embodiment of the invention and Figure 2 is a flow diagram of another embodiment of the invention. Corresponding numerals are utilized to designate corresponding apparatus elements in the two figures.

Referring to Figure 1, the apparatus includes an upper extraction column 10 and a lower extraction column 12 together with a steam distillation or fractionation column 14 and a phase separator 16 connected by lines hereinafter described. A feed line 18 including a flow control device 20, such as a metering pump, connects with the lower section of column 10 for introduction of feed thereto at a constant rate. A solvent feed line 22 having positioned therein a flow control valve 26 connects with an intermediate section of column 10 for introduction of solvent thereto at a controlled rate. A temperature-recorder-controller 28 connected with line 22 near column 10 operates a flow control valve 30 in a steam line 32 which passes steam thru a heater 34 in line 22. This arrangement permits heating the solvent stream to the proper temperature for introduction to column 10.

A raffinate effluent line 36 passes thru a condenser or cooler 37 and enters a surge tank 38 from which a raffinate product line 40 passes to suitable disposal. A raffinate recycle line 42 having positioned therein a flow control device 44 connects with solvent feed line 22 upstream of flow control valve 26. A solvent-extract effluent line 46 connects the bottom of column 10 with an intermediate section of column 12 for delivery of intermediate solvent-extract thereto. A flow control valve 48 actuated by an interface-level-controller 52 connected with the upper section of column 10 provides for withdrawal of solvent-extract from column 10 at a rate which maintains a substantially constant interface level between the solvent-extract phase and the raffinate phase in column 10. An intermediate raffinate effluent line 54 connects the top of column 12 with feed line 18. Line 54 may also connect directly with the lower section of column 10. A liquid or interface-level-controller 56 sensitive to the interface level in the upper section of column 12 is operatively connected to a flow control valve 58 in line 54 so as to maintain a substantially constant interface level in column 12 by regulating the flow of intermediate raffinate to column 10.

A line 60 connects the bottom of column 12 with an intermediate section of a steam distillation column 14 thereby providing flow of solvent-extract from extraction column 12 to separation column 14. A flow control valve 62 positioned in line 60 is operatively connected with a pressure-recorder-controller 64 which is sensitive to pressure in column 12 and operates valve 62 so as to maintain a selected predetermined pressure in column 12. A heater 66 positioned in line 60 near column 14 provides for heating the solvent-extract stream to the proper temperature for introduction at a corresponding temperature point in column 14. A solvent recycle line 68 connects the bottom of column 14 with lean solvent surge tank 69 which is also connected with solvent feed line 22. Flow of solvent in line 68 is regulated by flow control valve 70 operatively connected with liquid-level controller 72 which is responsive to the liquid level in the lower section of column 14 and regulates the flow of lean solvent in line 68 so as to maintain a substantially constant liquid level. Temperature control of the lean solvent in line 68 is provided by cooler 73, as desired.

Heat for operation of steam distillation column 14 is provided by recycle line 74 which passes thru heater 76 and returns to column 14. Water for the steam distillation is supplied by line 78 which connects with line 74 upstream of heater 76. A temperature-recorder-controller 80 sensitive to temperature in column 14 is operatively connected to a flow control valve 82 in a steam line 84 which passes steam thru heater 76 in indirect heat exchange with the liquid passing thru line 74, including water from line 78.

A cooling coil 86 positioned in the upper section of column 14 provides internal reflux for this column. An effluent line 88 connects with the top of column 14 and with an intermediate section of phase separator 16 for passage of distilled vapor into condenser 90 and thence into separator 16 where the extract containing entrained water is separated into a water phase 92 and an extract phase 94. A vent line 96 connects with the top of separator 16 for the withdrawal of uncondensed vapor from the system. A portion of the extract is withdrawn from separator 16 via line 98 and recovered as product. The flow of extract product is controlled by a suitable flow control device 100 positioned in line 98. The remaining portion of the rich extract is withdrawn thru line 102 and is passed as recycle to the lower section of extraction column 12. Flow of extract recycle is controlled by flow-control valve 104 which is actuated by liquid-level controller 108 which is in turn sensitive to the liquid level of the extract phase in separator 16. In this manner, liquid-level controller 108 operates valve 104 so as to withdraw extract at a sufficient rate, when taken with the constant flow of extract thru line 98, to maintain a substantially constant liquid level in separator 16.

The flow rate of extract product in line 98 is maintained substantially constant by metering pump 100 for predetermined periods such as 30, 60, or 90 minutes and is varied at desired intervals to maintain the desired product purity or composition. The balance of the extract is of course recycled as reflux. It is feasible to continuously ascertain the purity of product in line 102 by conventional methods and automatically regulate the flow in line 98 to maintain the desired product purity. Water is withdrawn from the water phase 92 in separator 16 thru line 78 at a constant rate by means of flow control device or metering pump 109 positioned in line 78, and the flow rate is periodically regulated by resetting pump 109 so as to maintain a suitable interface (or water) level in separator 16. However, an interface-level-controller on separator 16 may be utilized to control the flow of water in line 78 to automatically maintain the desired water level in the separator.

Control of the temperature of the extract recycle stream is provided by a heater 110 positioned in line 102. A heating fluid, such as steam, is passed thru the heater via line 111 under the control of valve 112 which is operated by temperature-recorder-controller 114 which in turn is sensitive to the temperature in line 102 and regulates the heating in heater 110 so as to provide a suitable predetermined temperature in the extract recycle stream.

Line 116 connects with lean solvent surge tank 69 so as to provide for replenishing the supply of solvent for the process. A number of flow indicating elements 118 are provided in some of the lines for measuring the flow in these lines at any particular time. Several temperature recorders 120 are connected at various points in the system for determining temperature. Several pumps 122 are shown positioned in the various lines to effect the desired flow and pressure in those lines. Other pumps and indicating devices may of course be utilized where needed.

The arrangement of apparatus in Figure 2 is similar to that shown in Figure 1, differing therefrom principally in the showing of a single extraction column 10 instead of two separate extraction columns 10 and 12 as in Figure 1. Figure 2 also utilizes a valve 124 in raffinate effluent line 36 which is operated by interface-level-controller 52.

The folowing examples are set forth to illustrate the invention and its applicability to different systems. The data given represent spot determinations under steady state conditions. The proportion of recycle extract to product was varied as conditions required in order to maintain substantially constant extract product composition. The data and examples are illustrative and should not be interpreted as unnecessarily limiting the invention.

EXAMPLE I

The apparatus shown in Figure 1 was utilized in separating naphthenes from a system comprising methyl Carbitol as the solvent and principally cyclohexane and normal heptane as the hydrocarbon mixture. The extraction columns were 4" in diameter and 30' long and were packed in conventional manner with 25.5' of ½" Berl saddles. The mixed hydrocarbon stream was prepared by adding normal heptane containing 2 percent by weight of methylcyclohexane to cyclohexane containing 3.5 weight percent dimethylpentanes. The mixed hydrocarbon feed thus prepared was fed at a rate of 2.60 gallons per hour thru line 18 under the control of metering pump 20 into the lower section of column 10. Methyl Carbitol containing 3.86 weight percent wated and having an API gravity of 5.8 at 60° F. was fed at a rate of 50.0 gallons per hour and a temperature of 120° F. into the upper section of column 10. The temperature in the bottom of column 10 was 105° F. and the pressure was 13 p. s. i. g. The flow of intermediate extract solvent from column 10 to column 12 was controlled by level-controller 52 so as to provide a constant interface level between raffinate and the extract phase in column 10. This intermediate extract phase contained 11.5 volume percent hydrocarbon and the weight percent of naphthenes in this hydrocarbon fraction was 46.8. The water content of this stream was 3.38 and the API gravity was 11.3 at 60° F.

The intermediate raffinate stream in line 54 contained 36.6 weight percent naphthenes calculated on a solvent free basis. The raffinate hydrocarbon in line 40 contained 1.8 weight percent naphthenes on a solvent free basis and was recovered at the rate of 1.28 gallons per hour. The flow rate of recycle raffinate in line 42 was 2.82 gallons per hour.

The extract-solvent in line 60 had an API gravity of 13.0 at 60° F. and contained 17.0 volume percent hydrocarbon and 3.72 weight percent water. The concentration of naphthenes in the hydrocarbon in this stream amounted to 95.6 weight percent. The extract recycle in line 102 and the extract product in line 98 contained 95.1 weight percent naphthenes on a solvent free basis. The product flow rate in line 98 was 1.10 gallons per hour while the reflux or recycle rate in line 102 was 9.86 gallons per hour.

Pressure-recorder-controller 64 was set to maintain a pressure of 30 p. s. i. g. in the lower section of column 12 and the temperature therein was 100° F. Temperature-recorder-controller 114 was set to maintain a stream temperature of 110° F.

EXAMPLE II

A refinery stream of 85 weight percent cyclohexane having the composition shown in the table below was extracted with methyl Carbitol in apparatus arranged as shown in Figure 1 to upgrade the cyclohexane to a concentration of 97.95 weight percent in the extract product stream from the process. The refinery cyclohexane feed was introduced to column 10 at the rate of 2.25 G. P. H. at a temperature of approximately 108° F. which was the temperature in the lower section of the column. The methyl Carbitol solvent, containing 3.9 weight percent water, was fed into the upper section of column 10 at the rate of 40.0 G. P. H. Raffinate hydrocarbon was withdrawn at the rate of 0.656 G. P. H. and the cyclohexane concentration in this raffinate hydrocarbon was 48.74 weight percent on a solvent-free basis. The raffinate stream contained 0.47 weight percent methyl Carbitol. In this particular run there was no recycle of raffinate hydrocarbon. The intermediate raffinate contained 88.73 weight percent cyclohexane on a solvent-free basis and the concentration of cyclohexane in the intermediate extract stream was 90.29, there being 16 volume percent hydrocarbon in this stream. The extract phase in line 60 contained 16.0 volume percent hydrocarbon of which 97.58 weight percent was cyclohexane. The reflux and extract hydrocarbon product contained 97.94 weight percent cyclohexane on a solvent-free basis. The reflux flow was at a rate of 7.41 G. P. H while the flow of extract hydocarbon product was at the rate of 1.70 G. P. H. The temperature in column 12 was approximately 100° F. and the pressure was maintained at 30 p. s. i. g.

Table

[Analysis in weight percent (calculated from infrared analysis).]

| Component | Hydrocarbon Feed | Extract Product | Raffinate Product |
| --- | --- | --- | --- |
| Methylcyclopentane | 0.00 | 0.00 | 0.00 |
| 2,2-Dimethylpentane | 2.38 | 0.09 | 7.85 |
| 2,4-Dimethylpentane | 4.94 | 0.39 | 19.00 |
| Cyclohexane | 85.49 | 97.95 | 48.74 |
| 3,3-Dimethylpentane | 1.27 | 0.22 | 3.13 |
| 1,1-Dimethylcyclopentane [1] | 3.06 | 1.26 | 7.96 |
| 2,3-Dimethylpentane | 1.09 | 0.09 | 4.67 |
| 2-Methylhexane | 1.77 | 0.00 | 8.65 |
| Total | 100.0 | 100.0 | 100.0 |

[1] From mass spectrometer analysis.

EXAMPLE III

A run was made in the apparatus of Figure 1 with a refinery stream containing 85.79 weight percent cyclohexane corresponding generally to the composition shown in the preceding table but using dry furfural as the solvent. Temperature and pressure conditions were maintained substantially as indicated in Example II. The flow of feed containing 85.79 weight percent of cyclohexane was at the rate of 1.49 G. P. H. and the solvent feed rate was 30.0 G. P. H. The furfural solvent contained 0.35 weight percent polymer and 0.0 weight percent water. Raffinate hydrocarbon product, containing 40.73 weight percent cyclohexane and 4.68 weight percent furfural, was withdrawn at a rate of 0.30 G. P. H. and raffinate recycle was at the rate of 4.5 G. P. H. The intermediate raffinate stream contained 92.56 weight percent cyclohexane on a solvent-free basis and 10.90 weight percent furfural while the intermediate extract stream contained 16.85 weight percent hydrocarbon. The extract phase flowing to the separation system contained 15.55 weight percent hydrocarbon. The reflux hydrocarbon stream contained 99.46 weight percent cyclohexane on a solvent-free basis and flowed at the rate of 9.60 G. P. H. while the extract product stream, having the same concentration of cyclohexane and 0.52 weight percent furfural, was recovered at the rate of 1.14 G. P. H.

EXAMPLE IV

The apparatus of Figure 1 was utilized in the extraction of refinery straight run gasoline, having a gravity of 57.2 API, a concentration of naphthenes, olefins and aromatics (NOA) of 53.1 liquid volume percent, and a boiling range of 220 to 262° F., with aqueous methyl Carbitol containing 4.2 weight percent water. The hydrocarbon feed rate was 1.28 G. P. H. The solvent feed rate was 60 G. P. H. Raffinate hydrocarbon containing 13.1 liquid volume percent NOA on a solvent-free basis and having a gravity of 66.1 API was recovered at the rate of 0.50 G. P. H. The boiling range of this stream was in the range of 231 to 269° F. The recycle of raffinate was at the rate of 3.0 G. P. H. Reflux and extract hydrocarbon product had an API of 50.2 and an NOA concentration of 84.8 liquid volume percent on a solvent-free basis and a boiling range of 218 to 266° F. The rate of reflux was 7.34 G. P. H. and extract product was recovered at the rate of 0.78 G. P. H. The temperature in column 10 was approximately 115° F. while that in column 12 was approximately 110° F. and the pressure in column 12 was maintained at 30 p. s. i. g.

A second run was made using as feed a refinery straight run gasoline having a boiling range of 297 to 328° F., a gravity of 51.8 API, and an NOA value of 51.6 liquid volume percent on a solvent-free basis. Aqueous methyl Carbitol was utilized and the run conditions were similar to those in Example IV. The extract product had a gravity of 46.3 API, an NOA value of 81.0 liquid volume percent, and a boiling range of 291 to 323° F.

Certain modifications of the invention will become apparent to those skilled in the art and the illustrative details disclosed are not to be construed as imposing unnecessary limitations on the invention.

We claim:

1. Apparatus for effecting liquid-liquid extraction of a mixed feed stream, comprising an extraction column; a feed line leading into an intermediate section of said column having means for controlling the rate of flow therein; a solvent feed line leading into an upper section of said column having means for controlling the rate of flow therein; a raffinate line leading from the uppermost section of said column; a solvent-extract line leading from the lowermost section of said column; means in said solvent-extract line for separating solvent-extract into a solvent stream and an extract stream; an extract effluent line and a separate solvent effluent line leading from the solvent-extract separation means; an extract recycle line branching from said extract effluent line for passing extract effluent to a lower section of said column; and means for proportioning the rate of flow in said extract effluent line downstream of said recycle line and in said extract recycle line so as to obtain an extract of substantially constant product concentration.

2. Apparatus for effecting liquid-liquid extraction of a mixed feed stream, comprising an extraction column; a feed line leading into an intermediate section of said column having means for controlling the rate of flow therein; a solvent feed line leading into an upper section of said column having means for controlling the rate of flow therein; a raffinate line leading from the upermost section of said column; a solvent-extract line leading from the lowermost section of said column; means in said solvent-extract line for separating solvent extract into a solvent stream and an extract stream comprising a steam stripping column having a line for introducing steam into its lower section, an extract effluent line from its upper section, and a solvent recycle line from its lowermost section connecting with said solvent feed line; a flow-control valve in said solvent recycle line; a liquid-level-controller sensitive to a liquid level in a lower section of said stripping column in operative control of last said valve; a phase separation vessel in said extract effluent line having an extract product line and an extract recycle line leading from an intermediate section thereof, said extract recycle line connecting with the lower section of said column; a condenser in said extract effluent line intermediate said stripping column and said vessel; means in said extract product line for controlling the flow rate therein; a flow control valve in said extract recycle line; a liquid-level controller sensitive to a liquid level in an intermediate section of said vessel at a level above the level of extract take-off in operative control of last said valve; and means for proportioning the rate of flow in said extract effluent line downstream of said recycle line and in said extract recycle line so as to obtain an extract of substantially constant product concentration.

3. The apparatus of claim 2 including a variable flow-control valve in said raffinate line; an interface-level-controller sensitive to an interface level in an upper section of said column at a level above said solvent feed line in operative control of said flow-control valve; a variable flow-control valve in said solvent-extract line upstream of said means therein; and a pressure-controller sensitive to pressure in said column and in operative control of last said valve.

4. The apparatus of claim 2 wherein said extraction column comprises two separate vessels enclosing the upper and lower sections of said extraction column, the lower end of the upper section and the upper end of the lower section being connected by an intermediate raffinate line and by an intermediate solvent-extract line.

5. The apparatus of claim 1 wherein said extraction column comprises two separate vessels enclosing said upper and lower sections, the lower end of the upper section and the upper end of the lower section being connected by an intermediate raffinate line and by an intermediate solvent-extract line.

6. The apparatus of claim 5 including a variable flow-control valve in said intermediate solvent-extract line; an interface-level controller sensitive to an interface level in said upper section in operative control of last said valve; a variable-flow-control valve in said solvent-extract line intermediate said column and said means for separating solvent-extract; and a pressure-controller sensitive to pressure in the lower portion of said lower section in operative control of last said valve.

7. A liquid-liquid extraction process comprising passing a feed stream comprising a plurality of liquid components into an intermediate section of an extraction zone; passing a solvent stream comprising a selective solvent for at least one of said components into an upper section of said extraction zone so as to effect commingling of said streams and extraction of at least one of said components to form a solvent-extract phase and a raffinate phase lean in said extract and establish an interface in said zone between said phases; withdrawing a raffinate stream from the uppermost section of said zone; withdrawing a solvent-extract stream from the lowermost section of said zone; separating said solvent-extract stream into a solvent stream and a concentrated extract stream; and controlling the operation of said extraction zone and the concentration of said at least one component in said concentrated extract stream by the steps comprising (1) maintaining a substantially constant flow of said feed and solvent streams, (2) withdrawing said solvent-extract stream at a controlled rate, (3) separating said concentrated extract stream into an extract product stream and an extract recycle stream, (4) regulating the flow rate of said extract product stream so as to maintain therein a predetermined concentration of said at least one component, and (5) recycling the remaining portion of said concentrated extract stream as said extract recycle stream to a lower section of said zone as reflux.

8. The process of claim 7 including separating said solvent-extract stream in a steam distillation zone so as to recover an aqueous-extract stream overhead and a kettle fraction comprising solvent; withdrawing solvent from the lower section of said distillation zone at such a rate as to maintain a desired liquid level therein; effecting separation of said aqueous-extract stream into an aqueous phase and an extract phase in a phase separation zone after condensing same; withdrawing a portion of said extract phase as said product stream and the remaining portion as said extract-rich recycle stream.

9. The process of claim 7 including withdrawing said raffinate stream at such a rate as to maintain said interface at a substantially constant level and withdrawing said solvent-extract stream at such a rate as to maintain a predetermined pressure in said extraction zone.

10. The process of claim 7 wherein said solvent-extract stream is withdrawn at such a rate as to maintain said interface at a substantially constant level.

11. A liquid-liquid extraction process comprising passing a feed stream comprising a plurality of liquid components into a lower section of a first extraction zone; passing a liquid solvent stream comprising a selective solvent for at least one of said components into an upper section of said first zone so as to effect commingling of said streams and extraction of at least one of said components to form a solvent-extract phase and a raffinate phase lean in said extract and establish an interface in said first zone between said phases; withdrawing a solvent-extract stream from a lower section of said first zone at a controlled rate and passing same into an upper section of a second extraction zone; passing an extract-rich recycle stream, obtained as hereinafter described, into a lower section of said second zone so as to effect commingling with said solvent-extract stream to form a rich extract phase and a raffinate phase lean in said extract and establish an interface between said phases in said second zone; withdrawing a raffinate stream from the uppermost section of said second zone at a controlled rate and passing same into a lower section of said first zone; withdrawing a raffinate stream from the uppermost section of said first zone; withdrawing a stream of rich extract phase from the lowermost section of said second zone at a controlled rate and passing same into an intermediate section of a fractionation zone maintained under conditions which separate said solvent from said extract; recovering an extract stream from said fractionation zone; withdrawing a portion of said extract stream and recycling same to said second zone as aforesaid extract-rich recycle stream; withdrawing the remaining portion of said extract stream as a product stream; and controlling the proportions of said recycle and product streams so as to obtain a product stream of controlled purity or product concentration.

12. A liquid-liquid extraction process comprising passing a feed stream comprising a plurality of liquid components into a lower section of a first extraction zone; passing a liquid solvent stream comprising a selective solvent for at least one of said components into an upper section of said first zone so as to effect commingling of said streams and extraction of at least one of said components to form a solvent-extract phase and a raffinate phase lean in said extract and establish an interface in said first zone between said phases; withdrawing a solvent-extract stream from a lower section of said first zone at a controlled rate so as to maintain the interface in said first zone at a desired level and passing same into an upper section of a second extraction zone; passing an extract-rich recycle stream, obtained as hereinafter described, into a lower section of said second zone so as to effect commingling with said solvent-extract stream to form a rich extract phase and a raffinate phase lean in said extract and establish an interface between said phases in said second zone; withdrawing a raffinate stream from the uppermost section of said second zone at a controlled rate so as to maintain the interface in said second zone at a desired level; withdrawing a stream of said rich extract phase from the lowermost section of said second extraction zone at a controlled rate and passing same into an intermediate section of a fractionation zone maintained under conditions which separate said solvent from said extract; recovering an extract stream from said fractionation zone; withdrawing a portion of said extract stream and recycling same to said second zone as aforesaid extract-rich recycle stream; withdrawing the remaining portion of said extract stream as a product stream; and controlling the proportions of said recycle and product streams so as to obtain a product stream of controlled purity or product concentration.

13. A liquid-liquid extraction process comprising passing a feed stream comprising a plurality of liquid components into a lower section of a first extraction zone; passing a liquid solvent stream comprising a selective solvent for at least one of said components into an upper section of said first zone so as to effect commingling of said streams and extraction of at least one of said components to form a solvent-extract phase and a raffinate phase lean in said extract and establish an interface in said first zone between said phases; withdrawing a solvent-extract stream from a lower section of said first zone at a controlled rate and passing same into an upper section of a second extraction zone; passing an extract-rich recycle stream, obtained as hereinafter described, into a lower section of said second zone so as to effect commingling with said solvent-extract stream to form a rich extract phase and a raffinate phase lean in said extract and establish an interface between said phases in said second zone; withdrawing a raffinate stream from the uppermost section of said second zone at a controlled rate and passing same into a lower section of said first zone; withdrawing a raffinate stream from the uppermost section of said first zone; withdrawing a stream of rich extract phase from the lowermost section of said second zone at a controlled rate and passing same into an intermediate section of a stream distillation zone so as to recover an aqueous extract stream overhead and a kettle fraction comprising solvent; withdrawing solvent from the lower section of said distillation zone at such a rate as to maintain a desired liquid level in said distillation zone; effecting separation of said aqueous extract stream into an aqueous phase and an extract phase in a phase-separation zone; withdrawing a portion of said extract stream and recycling same to said second zone as aforesaid extract-rich recycle stream; withdrawing the remaining portion of said extract stream as a product stream; and controlling the proportions of said recycle and product streams so as to obtain a product stream of controlled purity or product concentration.

References Cited in the file of this patent

UNITED STATES PATENTS

| | | |
|---|---|---|
| 1,982,513 | Grote et al. | Nov. 27, 1934 |
| 2,210,541 | Tijmstra | Aug. 6, 1940 |
| 2,299,426 | Rosebaugh | Oct. 20, 1942 |
| 2,396,303 | Cummings et al. | Mar. 12, 1946 |
| 2,654,792 | Gilmore | Oct. 6, 1953 |
| 2,695,322 | Weedman | Nov. 23, 1954 |
| 2,709,678 | Berger | May 31, 1955 |
| 2,728,803 | McCaulay et al. | Dec. 27, 1955 |
| 2,746,846 | Grunewald et al. | May 22, 1956 |

OTHER REFERENCES

Tivy: "The Oil and Gas Journal," November 25, 1948, pages 85 to 87, 89, 124 and 127.